United States Patent
Cho et al.

(10) Patent No.: US 8,254,345 B2
(45) Date of Patent: Aug. 28, 2012

(54) BEACON SCHEDULING METHOD IN MULTI-HOP AD-HOC NETWORKS

(75) Inventors: Jun-haeng Cho, Seongnam-si (KR); Chung-gu Kang, Seoul (KR); Il-whan Kim, Incheon (KR); Kun-hyun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1660 days.

(21) Appl. No.: 11/513,040

(22) Filed: Aug. 31, 2006

(65) Prior Publication Data

US 2007/0047510 A1    Mar. 1, 2007

(30) Foreign Application Priority Data

Aug. 31, 2005    (KR) .............................. 2005-0080698

(51) Int. Cl.
*H04J 3/00* (2006.01)
(52) U.S. Cl. ........ 370/337; 370/278; 370/315; 370/329; 370/442; 370/338
(58) Field of Classification Search .................. 370/278, 370/282, 315, 321–322, 329, 337, 442, 338, 370/445, 432, 458
See application file for complete search history.

(56) References Cited

U.S. PATENT DOCUMENTS

| | | | | |
|---|---|---|---|---|
| 5,506,863 A * | 4/1996 | Meidan et al. | ................ | 375/134 |
| 6,577,641 B1 * | 6/2003 | Izumi | ............................ | 370/442 |
| 7,460,503 B2 * | 12/2008 | Young | .......................... | 370/331 |
| 7,796,637 B2 * | 9/2010 | Doi et al. | ....................... | 370/445 |
| 2004/0003111 A1 * | 1/2004 | Maeda et al. | .................. | 709/237 |
| 2004/0184473 A1 * | 9/2004 | Tavli et al. | ..................... | 370/445 |
| 2005/0030967 A1 * | 2/2005 | Ohmi et al. | .................... | 370/445 |
| 2005/0047428 A1 * | 3/2005 | Park et al. | ...................... | 370/445 |
| 2005/0243751 A1 * | 11/2005 | Yoon et al. | .................... | 370/312 |
| 2006/0007907 A1 * | 1/2006 | Shao et al. | ..................... | 370/347 |
| 2006/0040701 A1 * | 2/2006 | Long et al. | ..................... | 455/525 |
| 2006/0268745 A1 * | 11/2006 | Hur et al. | ....................... | 370/254 |
| 2007/0026794 A1 * | 2/2007 | Ayyagari et al. | ............. | 455/11.1 |

FOREIGN PATENT DOCUMENTS

EP     1528720       *  4/2005
PC     2004/062198      7/2004

\* cited by examiner

*Primary Examiner* — Rafael Pérez-Gutiérrez
*Assistant Examiner* — Lameka J. Kirk
(74) *Attorney, Agent, or Firm* — Sughrue Mion, PLLC

(57) ABSTRACT

A beacon scheduling method in multi-hop ad-hoc communications is provided. This method can prevent overhead in a manner that a base station (BS) transmits beacon slot information to a carrier sense multiple access (CSMA)/collision avoidance (CA) node (CN) and a gateway (GW) through contention-free time division multiple access (TDMA) communications at initial clustering, the CN and the GW performs a sequential clustering to forward the beacon slot information to a cluster head (CH), the CH aggregates joining messages from nodes and assigns non-colliding beacon slots to the nodes, and the GW uses a beacon slot frame of a beacon transmission period (BTP) used by its selected CH in a beacon reply period (BRP) as well. Accordingly, the CH does not need to separately perform the initialization to elect the beacon slot, and the GW also does not require a separate initialization to select the beacon relay slot.

8 Claims, 10 Drawing Sheets

Cluster 1　　　　Cluster 2

[ RTS / CTS Handshaking ]

[CSMA / CA]

● CN
○ TN

[Beacon Collision in BTP]

[Beacon Collision in BRP]

BEACON SCHEDULING METHOD IN MULTI-HOP AD-HOC NETWORKS

CROSS-REFERENCE TO RELATED APPLICATIONS

This application claims the benefit under 35 U.S.C. § 119 (a) from Korean Patent Application No. 2005-80698 filed on Aug. 31, 2005 in the Korean Intellectual Property Office, the entire disclosure of which is incorporated herein by reference.

BACKGROUND OF THE INVENTION

1. Field of the Invention

Methods consistent with the present invention relate to a beacon scheduling in multi-hop ad-hoc communications. More particularly, the present invention relates to a beacon scheduling method in multi-hop ad-hoc communications for preventing overhead in a manner that a base station (BS) transmits beacon slot information to a carrier sense multiple access (CSMA)/collision avoidance (CA) node (CN) and a gateway (GW) through contention-free time division multiple access (TDMA) communications at an initial clustering, the CN and the GW perform sequential clustering to forward the beacon slot information to a cluster head (CH), the CH aggregates joining messages from nodes and assigns non-colliding beacon slots to the nodes, and the GW uses a beacon slot frame of a beacon transmission period (BTP) used by its selected CH in a beacon reply period (BRP) as well.

2. Description of the Related Art

Generally, a wireless personal area network (WPAN) adopts the hierarchical routing based on clusters more frequently than flat routing.

To avoid collisions among center nodes within a cluster, the cluster-based hierarchical routing classifies communications schemes between sensor nodes and the cluster head largely into a time division multiple access (TDMA) scheme based on the reserved allocation and a carrier sense multiple access (CSMA)/collision avoidance (CA) based on contention.

FIG. 1A depicts the reservation-based TDMA scheme using a single frequency channel.

As shown in FIG. 1A, a fundamental unit of the WPAN is a piconet consisting of a sole piconet coordinator (PC) and more than one mobile device (DEV) which shares a unique network identifier. The PC forms a piconet and provides a basic communicating timing by transmitting a beacon, and provides wireless communication services such as quality of service (QoS), synchronization, a power saving mode, and media access control (MAC) with respect to piconet devices in its coverage area.

According to IEEE 802.15.3 standard, the piconet is arbitrarily established if necessary. In the piconet, a plurality of devices independently shares a sole medium using a peer-to-peer technology and communicates with one another using a multi-hop scheme. Such a piconet is called an ad-hoc network. The multi-hop scheme delivers packets originated from a source node to a destination node by way of a plurality of mobile devices which act as both a host and a router in communications among mobile devices over the ad-hoc network. Since the transmission range of the wireless propagation in the piconet is limited to 10m at maximum, the packets may not be delivered from the source node directly to the destination node on occasion.

As such, the plurality of devices in the piconet share the sole medium for communications. Hence, to avoid collisions during communications between the devices, each device is allowed to communicate at an appropriate time by controlling the devices' access to the medium. As shown in FIG. 1A, data are transmitted among the sensor nodes without collisions by reserving and allocating timings T1, T2 and T3 to each cluster in the same frequency channel.

However, the TDMA scheme inevitably encounters inter-cluster interference in a multi-cluster environment. In more detail, when sensor nodes located in an overlapping area between adjacent clusters transmit data, other sensor nodes transmitting data in a neighboring cluster may be interfered with. Thus, the multi-frequency channel is required to avoid the interference between the piconets in the hierarchical structure.

FIG. 1B depicts the contention-based CSMA/CA by use of a single frequency channel.

As shown in FIG. 1B, the contention-based CSMA/CA scheme allows the data transmission between the sensor nodes without collisions by sending a request to send (RTS)/clear to send (CTS) signal between a cluster head (CH) and a sensor node within the cluster. However, since the data is broadcast in the single frequency channel, collisions between nodes drastically increase as the number of sensor nodes increases. Accordingly, the number of data retransmissions also increases and more beacon slots are required to reduce the collisions.

FIG. 1C depicts beacon collisions in a beacon transmission period (BTP) and a beacon relay period (BRP).

Referring to FIG. 1C, a beacon and a query are transmitted in the BTP and the BRP. The CH or a base station (BS) transmits in the BTP, and a first gateway GW1 transmits in the BRP.

Specifically, the CH or the BS transmits the beacon and the query to the GW1, a TDMA node (TN), and a CSMA/CA node (CN) in the BTP of the first frame. In response to this, GW1 and GW2, upon receiving the beacon and the query from the CH or the BS, send a beacon and a query to neighboring CH1 and CH2 in the BRP of the first frame.

A plurality of CHs broadcast the beacon and the query in the BTP. At this time, since the CHs are two hops away, it is impossible to avoid the collision through active and passive scanning. When a plurality of GWs unicast the beacon and the query to the CH in the BRP, it is also impossible to avoid the collision through the active and passive scanning since the GWs are away from one another by one or two hops. Furthermore, the beacon information is delayed, and the CH and the GW require additional energy consumption.

SUMMARY OF THE INVENTION

According to an aspect of the present invention, there is provided a beacon scheduling method in multi-hop ad-hoc communications without overhead. A sequential clustering is performed in a manner that a BS sends beacon slot information to a CN and a GW through contention-free TDMA communications at an initial clustering, and the CN and the GW also send beacon slot information to a CH. The CH aggregates joining messages from the nodes, and selects and assigns beacon slots having no collision to the nodes. The GW uses a beacon slot frame of the BTP used by its selected CH in the BRP.

A beacon scheduling method in a multi-hop ad-hoc network, includes transmitting an advertisement message to initial nodes (INs); receiving respective joining messages from each of the INs; and assigning non-colliding beacon slots based on the joining messages.

The joining messages may contain information relating to a node identifier (ID), a status and a beacon slot. The assigning operation discussed above may include assigning beacon slots of a beacon transmission period (BTP) using contention-free time division multiple access (TDMA) communications.

The advertisement message may be transmitted from a base station (BS) or a cluster head (CH) to each of the INs. Before the assigning operation, the IN which is assigned the beacon slot may become one of a gateway (GW), a CH and an ordinary node (ON).

When the IN is previously assigned a beacon slot, the receiving operation may included receiving a joining message containing information relating to the previous beacon slot. The assigning operation may include selecting a beacon slot which does not collide with the previous beacon slot.

When the CH assigns a frame of the BTP to the GW as the beacon slot, the GW may use the same frame of a beacon relay period (BRP) as the frame of the BTP, and as a beacon slot. When the BS assigns a frame of the BTP to the CH as a beacon slot, the CH may assign the GW or the ON another frame of the BTP which does not collide with the frame of the BTP.

A sequential clustering may be carried out in a manner that the BS sends beacon slot information to the GW in a frame of the BTP, the GW forwards the beacon slot information to the CH in a frame of the BRP, and the CH forwards the beacon slot information to another GW in another frame of the BTP. The other GW may forward the beacon slot information to another CH in another frame of the BRP which is the same as the other frame of the BTP.

BRIEF DESCRIPTION OF THE FIGURES

These and/or other aspects of the present invention will become more apparent and more readily appreciated from the following description of exemplary embodiments thereof, with reference to the accompanying drawings, in which.

DETAILED DESCRIPTION OF EXEMPLARY EMBODIMENTS OF THE PRESENT INVENTION

Figure 1A:
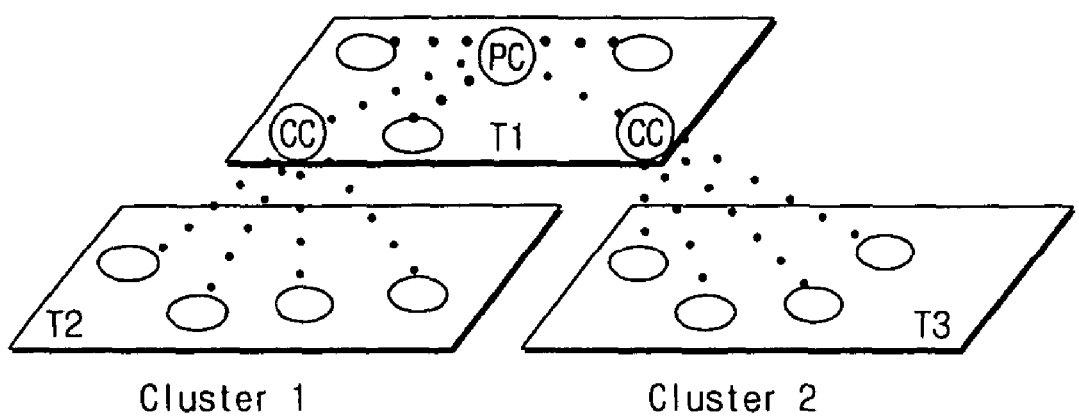
FIG. 1A illustrates a reservation-based TDMA scheme using a single frequency channel.
Figure 1A:
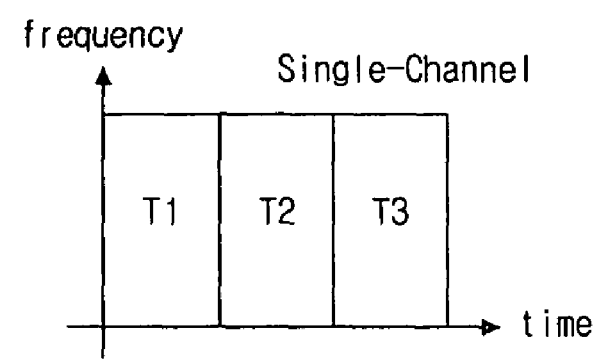
Figure 1B:
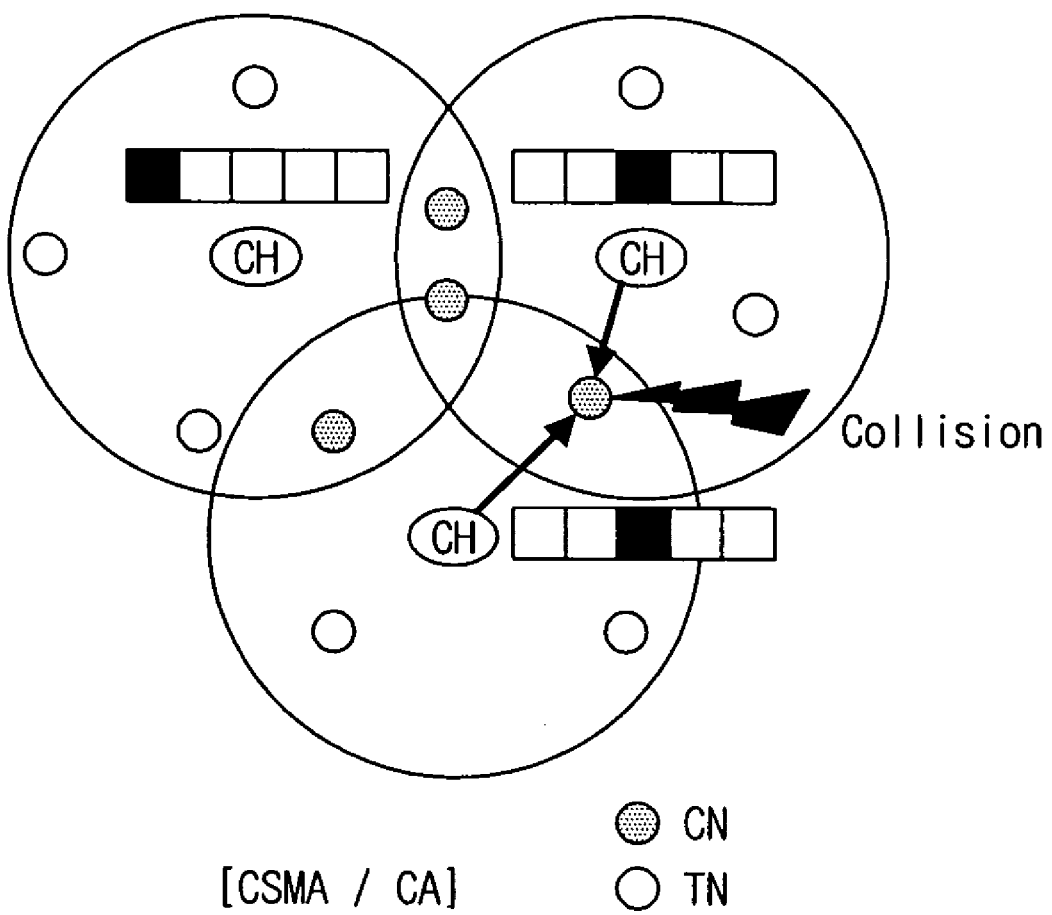
FIG. 1B illustrates a contention-based CSMA/CA scheme using a single frequency channel.
Figure 1C:
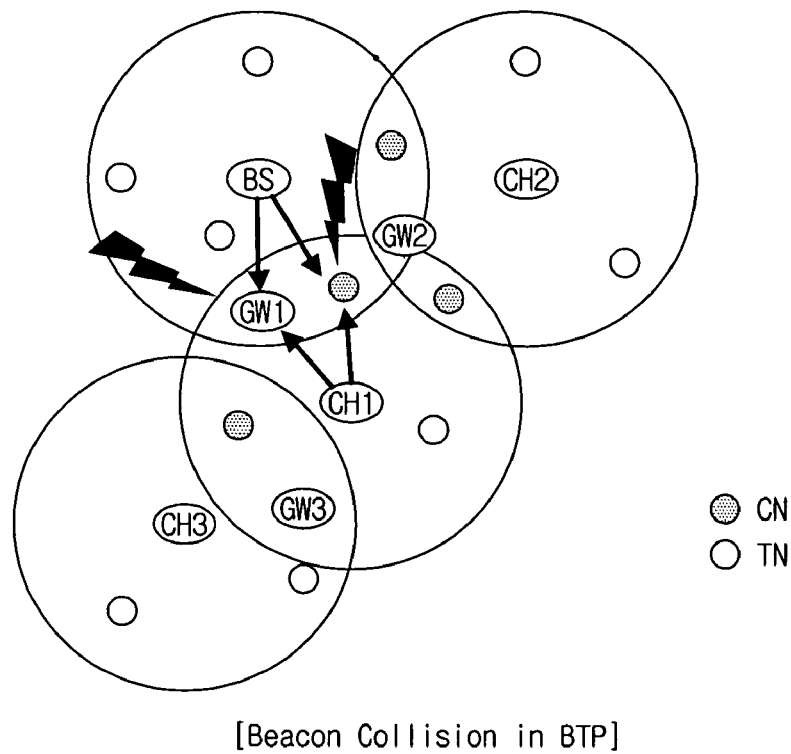
FIG. 1C illustrates beacon collisions in a BTP and a BRP.
Figure 1C:
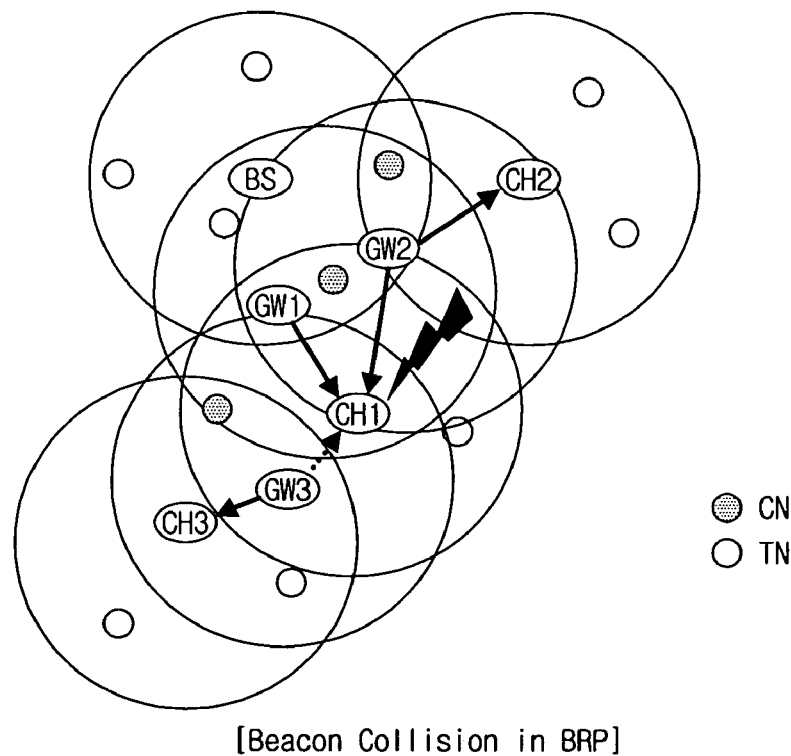

Certain exemplary embodiments of the present invention will now be described in greater detail with reference to the accompanying drawings.

In the following description, the same drawing reference numerals are used to refer to the same elements, even in different drawings. The matters defined in the following description, such as detailed construction and element descriptions, are provided as examples to assist in a comprehensive understanding of the invention. Also, well-known functions or constructions are not described in detail, since that would obscure the invention in unnecessary detail.

Figure 2:
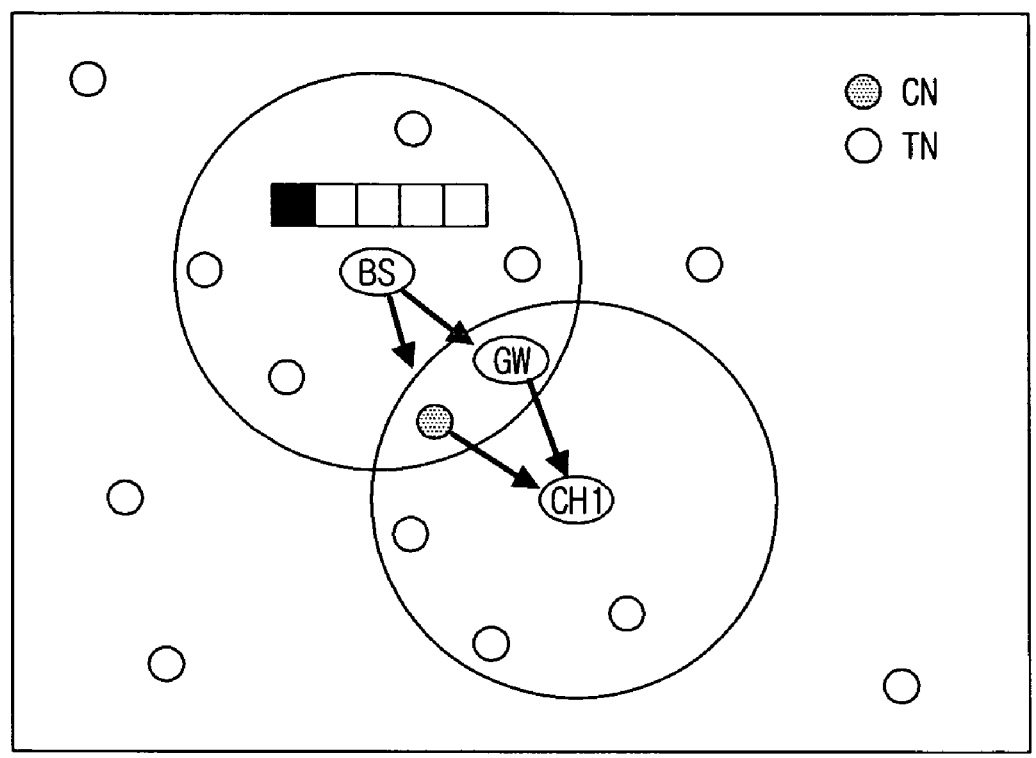
FIG. 2 illustrates a beacon scheduling using a sequential clustering according to an exemplary embodiment of the present invention.

FIG. 2 depicts a beacon scheduling using a sequential clustering according to an exemplary embodiment of the present invention.

As shown in FIG. 2, in the sequential clustering for the beacon scheduling, a BS sends beacon slot information to a GW and a CN. The GW and the CN, receiving the beacon slot information, forwards the beacon slot information to a CH1 which is selected as a CH within a cluster.

The CH takes charge of the cluster. The CH transmits the beacon and the query to GW, TN and CN within its cluster, aggregates data received from them, and transmits the aggregated data to the GW which transmitted the beacon and the query to the CH. Additionally, the CH manages resources of a TDMA sub-frame, which will be explained later. In this respect, it can be said that the CH functions as a coordinator.

The GW is a node selected according to a certain algorithm from nodes connected with more than two CHs by one hop. The GW forwards the beacon and the query received from the CH to a neighboring CH, and forwards data received from the neighboring CH to the CH which transmitted the beacon and the query. It is noted that the neighboring CH is a CH of a neighboring cluster.

The TN is a sensor node which transmits data relating to an event occurred in a relevant area to a CH which transmitted the beacon and the query to the TN. Also, the TN is connected with a CH by one hop. In other words, the TN resides in an area where clusters do not overlap (hereafter, referred to as a non-overlapping area). The TN communicates with the CH by accessing the medium according to the TDMA scheme.

The CN, similar to the TN, is a sensor node which transmits data relating to an event occurred in a relevant area to a CH which transmitted the beacon and the query to the CN. A difference from the TN lies in that the CN is connected with more than two CHs by one hop. That is, the CN resides in an area where the clusters overlap (hereafter, referred to as an overlapping area). The CN communicates with the CH by accessing the medium according to the CSMA/CA scheme.

Figure 3:
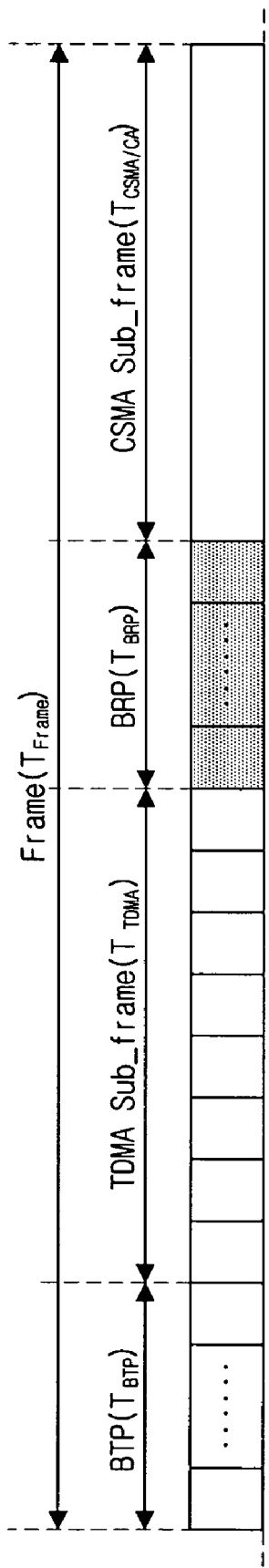
FIG. 3 illustrates a format of a frame used for the beacon scheduling according to an exemplary embodiment of the present invention.

FIG. 3 depicts a format of a frame used for the beacon scheduling according to an exemplary embodiment of the present invention.

Referring to FIG. 3, the frame used for the beacon scheduling includes a BTP, a TDMA sub-frame, a BRP and a SCMA/CA sub-frame. As can be seen from FIG. 3, the length of the BTP, the TDMA sub-frame, the BRP and the CSMA/CA sub-frame is $T_{BTP}$, $T_{TDMA}$, $T_{BRP}$ and $T_{CSMA/CA}$, respectively.

In FIG. 3, the BTP is used for the downstream link data transmission of the CH, and is broadcast to the GW, the CN and the TN by the CH. The CH informs each TN of TDMA slot information through the BTP. Note that the TDMA slot information is information relating to a TDMA slot assigned to each TN in the TDMA sub-frame. The TDMA slot information can be transmitted together with the beacon and the query for the sake of efficient transmission.

The TDMA sub-frame is used for the TN to transmit data to a CH which transmitted the beacon and the query to the TN. More specifically, the TN accesses the medium and transmits data in its assigned TDMA slot of the TDMA sub-frame. That is, the TDMA sub-frame is used for the upstream link data transmission of the TN.

The BRP is used for the GW to unicast the beacon and the query received from the CH to a neighboring CH. In brief, the BRP is used for the downstream link data transmission of the GW.

The CSMA/CA sub-frame is used for the CH, GW and CN to access the medium and transmit data through the contention. In further detail, the GW and the CN send data to a CH which transmitted beacons to them, and the CH sends the aggregated data which was received from the GW and the CN, to a GW which transmitted the beacon and the query to the CH. In brief, the CSMA/CA sub-frame is used for the upstream link data transmission of the CH, GW and CN.

Figure 4A:
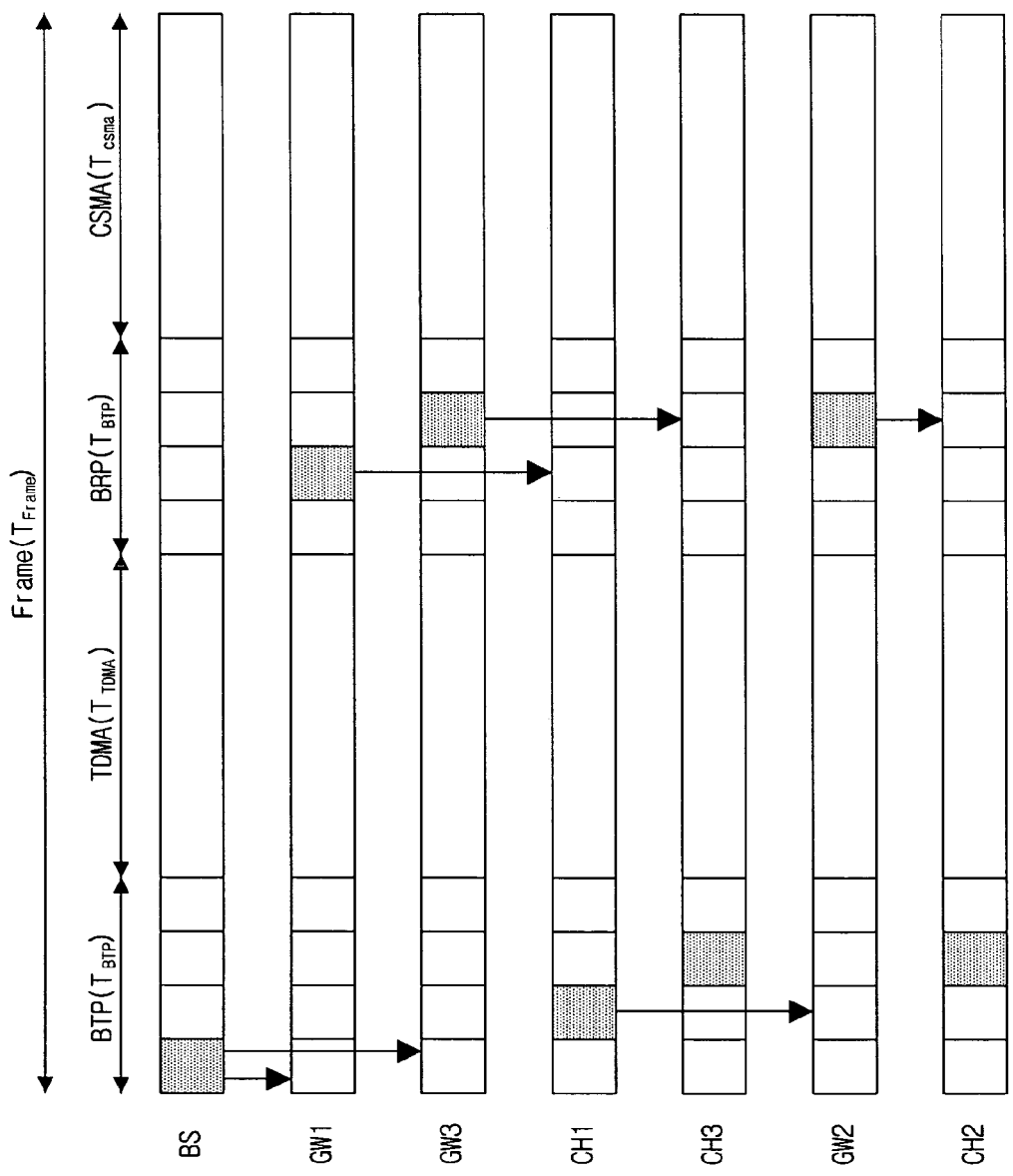
FIGS. 4A and 4B illustrate the beacon scheduling using the BTP and the BRP.
Figure 4B:
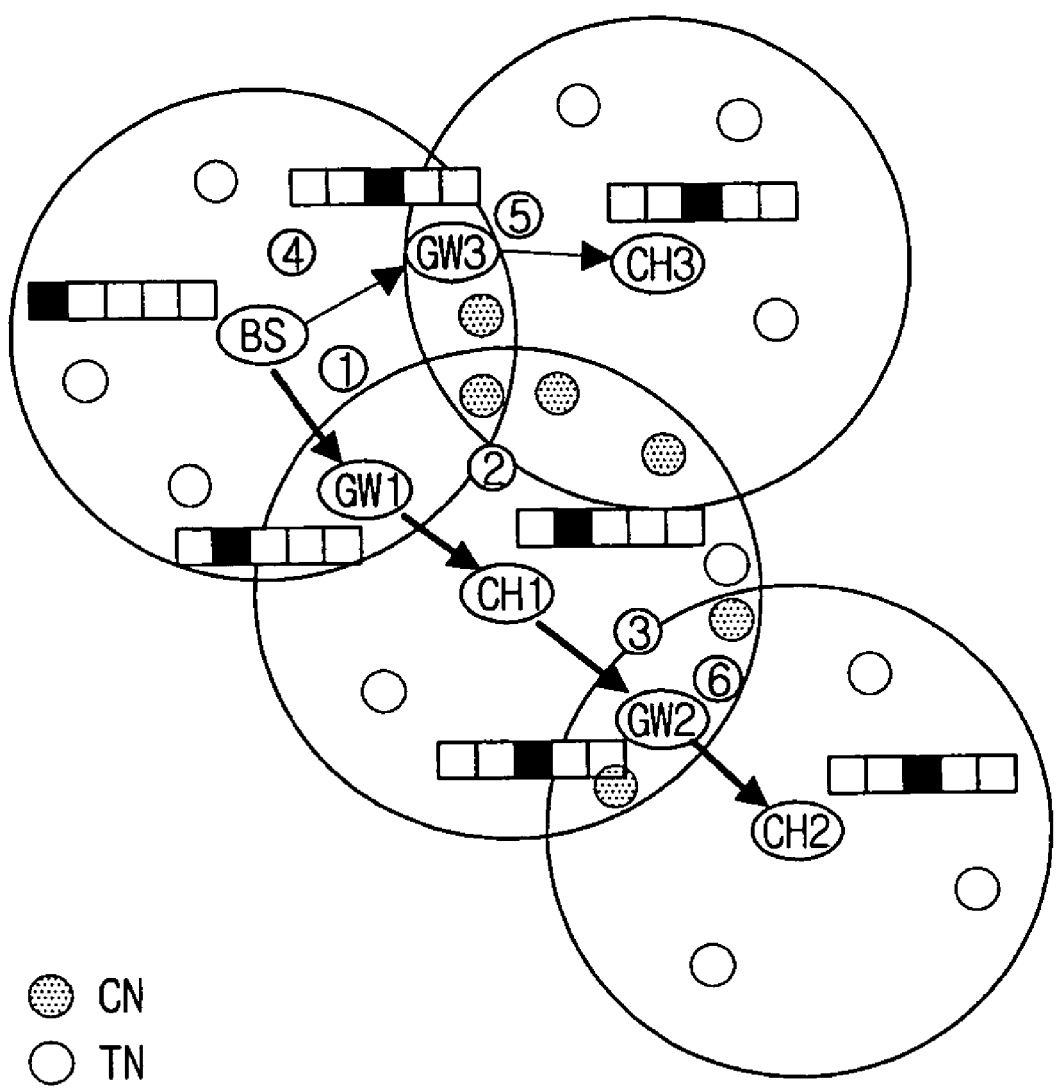

FIGS. 4A and 4B depict a beacon scheduling using the BTP and the BRP.

Referring to FIGS. 4A and 4B, a BS sends beacon slot information to a GW1 in a first frame of the BTP (①). The GW1 forwards the received beacon slot information to a CH1 in a second frame of the BRP (②), and the CH1 forwards the received beacon slot information to a GW2 in the second frame of the BTP (③).

Meanwhile, the BS transmits beacon slot information to a GW3 in the first frame of the BTP (④), and the GW3 forwards the received beacon slot information to a CH3 in a third frame of the BRP (⑤).

Next, the GW2, upon receiving the beacon slot information from the CH1 in the second frame of the BTP, forwards the beacon slot information to a CH2 in a third frame of the BRP (⑥).

Figure 5:
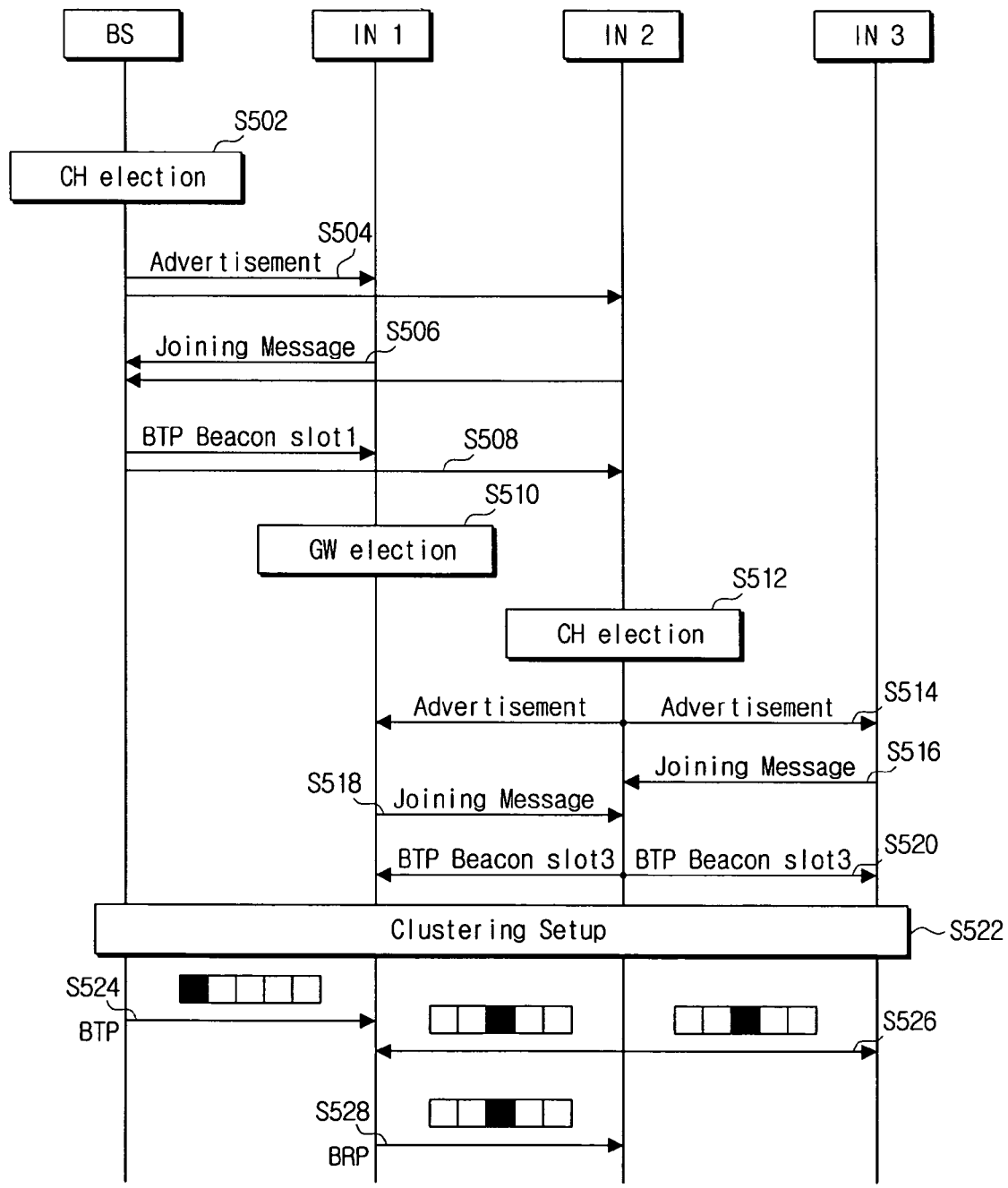
FIG. 5 illustrates a beacon slot allocation at the initial clustering.

FIG. 5 depicts a beacon slot allocation at the initial clustering.

Referring to FIG. 5, the initial clustering is carried out among a BS, an initial node (IN) IN1, an IN2 and an IN3.

In the initial clustering, the BS elects a CH (S502).

Next, the BS sends an advertisement message to the IN1 and IN2 within one-hop (S504).

Upon receiving the advertisement message, the IN1 and the IN2 send a joining message containing previous beacon reception information, to the BS (S506). The joining message contains information relating to a node ID, a status, beacon slot and so on.

The BS aggregates the joining messages from the IN1 and the IN2, selects BTP beacon slot1 having no collision with respect to the INs, and broadcasts a beacon assignment message including the selected BTP beacon slot1 in the BTP (S508). The beacon assignment message contains a node ID, a cluster beacon slot, and so on.

The IN1 is assigned the BTP beacon slot1 and elected as a GW based on the information relating to the beacon slot (S510).

The IN2, which is assigned the BTP beacon slot1 from the BS, is elected as a CH based on the information relating to the beacon slot (S512).

Next, the CH being the IN2 sends an advertisement message to one-hop nodes IN1 and IN3 (S514).

The IN3, receiving the advertisement message from the CH, sends a joining message containing information relating to a node ID, a status and a previous beacon slot, to the CH (S516).

Likewise, as the GW being the IN1 uses the BTP beacon slot1 assigned from the BS, the GW sends to the CH a joining message indicating the BTP beacon slot1 is used currently (S518).

The CH sends to the IN1 and the IN3 a beacon assignment message containing the BTP beacon slot1 and a non-colliding BTP beacon slot3 (S520).

Next, the BS, the GW, the CH, and the IN3 carry out the clustering setup based on the information relating to the assigned beacon slot (S522). Hence, the IN3 becomes an ordinary node (ON) according to the BTP beacon slot3.

Therefore, the beacon and the query are transmitted from the BS to the GW in the BTP beacon slot1 which is the first frame of the BTP (S524). The CH transmits the beacon and the query to the GW and the ON in the BTP beacon slot3 which is the third frame of the BTP (S526). The GW transmits the beacon and the query to the CH in the same third frame of the BRP as the BTP beacon slot3 assigned from the CH (S528).

Figure 6:
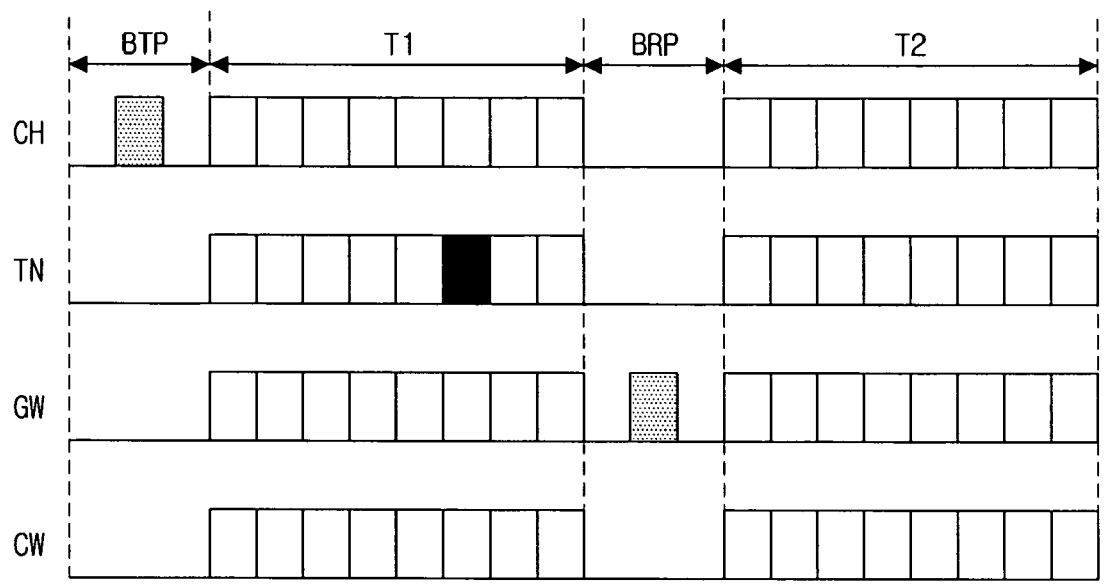
FIG. 6 illustrates a beacon slot allocation of a parent CH and a child CH.
Figure 6:
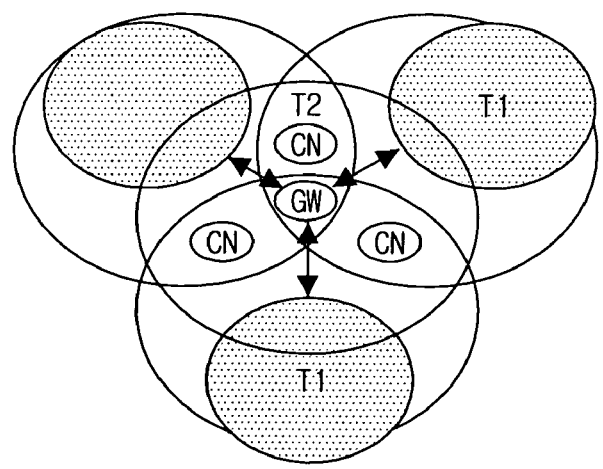

FIG. 6 illustrates a beacon slot allocation of a parent CH and a child CH.

According to the IEEE 802.15.3 standard, a parent (PNT) PC and a child PC (Dv) are separated by one hop and the time division as many as the number of child PCs is required. In contrast, in the exemplary embodiment of the present invention, as shown in FIG. 6, it is noted that the beacon slot frame T1 for the TN and the BRP beacon slot frame for the GW, that is, only two sub-frames, are required regardless of the number of child CHs.

Figure 7:
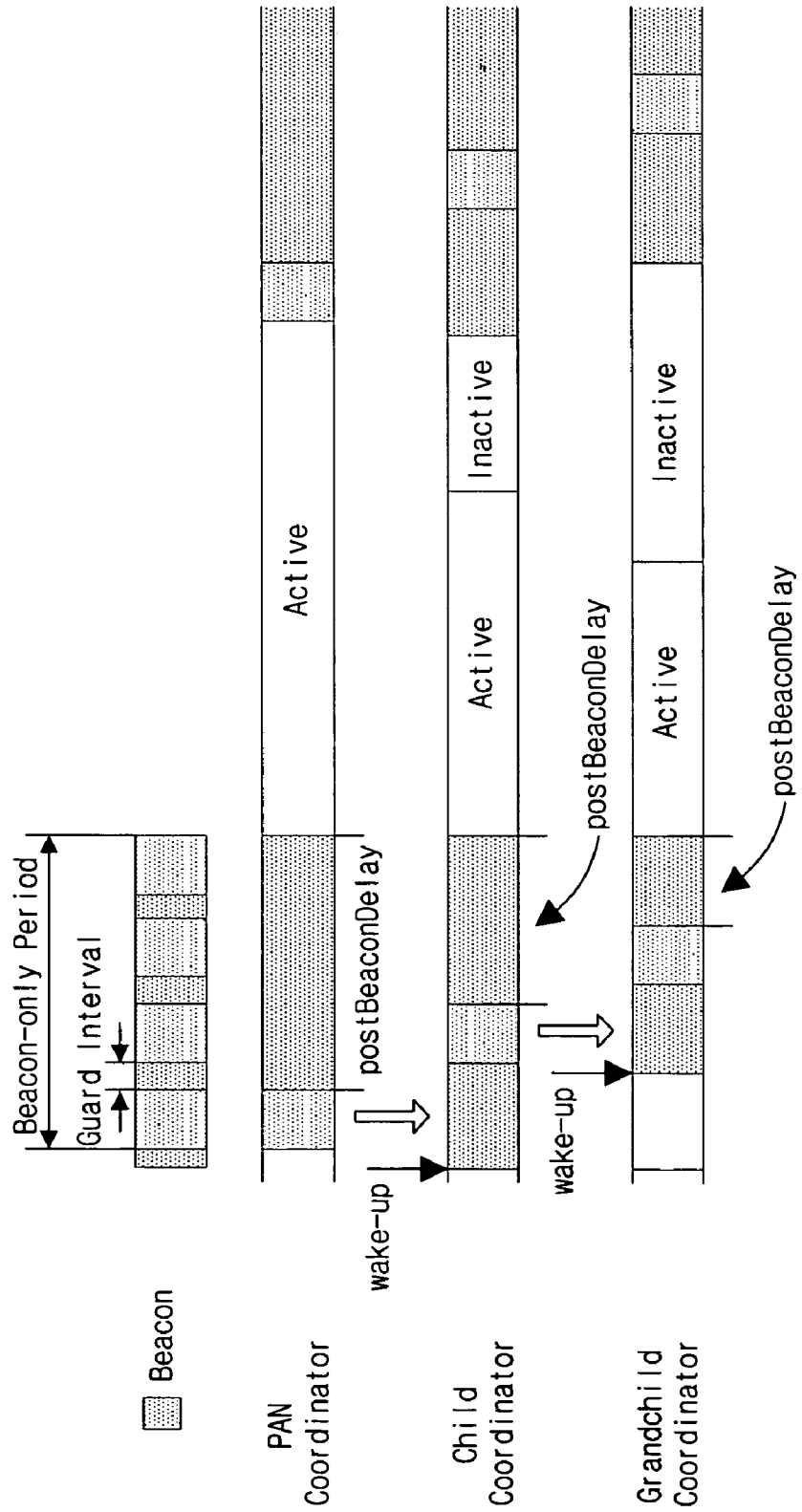
FIG. 7 illustrates an inter-generation beacon slot in the multi-hop network.

FIG. 7 illustrates an inter-generation beacon slot in a multi-hop network.

Referring to FIG. 7, a beacon-only period includes a plurality of guard intervals between beacons.

In FIG. 7, the parent coordinator has a beacon-only period including a beacon period and a postBeaconDely, and an active period. The child coordinator has a beacon-only period including a wake-up period, a beacon period and a postBeaconDelay, an active period and an inactive period. It is noted that the postBeaconDelay and the active period of the child coordinator are shorter than those of the parent coordinator. Similar to the child coordinator, the grandchild coordinator has a beacon-only period which includes a wake-up period, a beacon period and a postBeaconDelay, an active period and an inactive period. As can be seen, the postBeaconDelay period and the active period of the grandchild coordinator are shorter than those of the child coordinator.

As set forth above, the CH does not need to separately perform the initialization to acquire information from two hops distance to elect the beacon slot, and the GW also does not require a separate initialization for the RTS/CTS contention to select the beacon relay slot.

Furthermore, since the beacon is transmitted between the CH and the GW without collision, the lifetime of the CH and the GW can be lengthened. The minimization of the BTP and the BRP can extend the lifetime of the entire network and enhance the band efficiency.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A beacon scheduling method in a multi-hop ad-hoc network, comprising:
   (a) transmitting an advertisement message to initial nodes (INs);
   (b) receiving respective joining messages from each of the INs; and
   (c) assigning non-colliding beacon slots based on the respective joining messages,
   wherein the advertisement message is transmitted from one of a base station (BS) and a cluster head (CH) to each of the INs,
   wherein, before said operation (c), an IN which is assigned one of the beacon slots becomes one of a gateway (GW), a cluster head (CH), and an ordinary node (ON),
   wherein, when the CH assigns a frame of a beacon transmission period (BTP) to the GW as a first beacon slot, the GW uses a same frame of a beacon relay period (BRP) as the frame of the BTP, as a second beacon slot.

2. The beacon scheduling method of claim 1, wherein the respective joining messages comprise information relating to at least one of a node identifier (ID), a status and a beacon slot.

3. The beacon scheduling method of claim 1, wherein said operation (c) comprises assigning beacon slots of a beacon transmission period (BTP) using contention-free time division multiple access (TDMA) communications.

4. The beacon scheduling method of claim 1, wherein, when an IN is previously assigned a beacon slot, said operation (b) comprises receiving respective joining messages containing information relating to the previous beacon slot.

5. The beacon scheduling method of claim 4, wherein said operation (c) comprises selecting a beacon slot which does not collide with the previous beacon slot.

6. The beacon scheduling method of claim 1, wherein, when a base station (BS) assigns a frame of the BTP to the CH as a beacon slot, the CH assigns one of the GW and the ON another frame of the BTP which does not collide with the frame of the BTP.

7. The beacon scheduling method of claim 1, wherein a sequential clustering is carried out in a manner that a base station (BS) sends beacon slot information to the GW in a frame of a beacon transmission period (BTP), the GW forwards the beacon slot information to the CH in a frame of a beacon relay period (BRP), and the CH forwards the beacon slot information to another GW in another frame of the BTP.

8. The beacon scheduling method of claim 7, wherein said another GW forwards the beacon slot information to another CH in another frame of the BRP which is the same as said another frame of the BTP.

* * * * *